(12) United States Patent
Sodagar (10) Patent No.: US 12,356,015 B2
(45) Date of Patent: Jul. 8, 2025

(54) METHOD AND APPARATUS FOR SIGNALING CMAF SWITCHING SETS IN ISOBMFF

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 18/487,596

(22) Filed: Oct. 16, 2023

(65) Prior Publication Data

US 2024/0129537 A1  Apr. 18, 2024

Related U.S. Application Data

(60) Provisional application No. 63/417,114, filed on Oct. 18, 2022.

(51) Int. Cl.
*H04N 19/70* (2014.01)
*H04N 19/44* (2014.01)

(52) U.S. Cl.
CPC ............. *H04N 19/70* (2014.11); *H04N 19/44* (2014.11)

(58) Field of Classification Search
CPC ........ H04N 19/10; H04N 19/70; H04N 19/44; H04N 21/2343; H04N 21/23439; H04N 21/845; H04L 65/61; H04L 67/02

USPC ..... 348/469, 467, 473; 375/240.26; 709/217
See application file for complete search history.

(56) References Cited

U.S. PATENT DOCUMENTS

| 11,621,985 B2* | 4/2023 | Bentaleb .......... H04N 21/44209 709/217 |
| 2021/0185411 A1 | 6/2021 | Denoual et al. |
| 2021/0211766 A1 | 7/2021 | Stockhammer et al. |

OTHER PUBLICATIONS

"Information technology—Coding of audio-visual objects—Part 12: ISO base media file format," ISO/IEC JTC 1/SC 29 N, Sep. 2022, DIS 14496-12:202x(E) (327 pages total).

(Continued)

*Primary Examiner* — Sherrie Hsia
(74) *Attorney, Agent, or Firm* — Sughrue Mion, PLLC (57) ABSTRACT

Method, apparatus, and system for encoding or decoding media are provided. The process may include obtaining a track group entry box from an ISO base media file format (ISOBMFF) track associated with a video data. It may also include obtaining a first track among the one or more tracks in the CMAF switching set associated with the video data that has a first alternative group parameter and obtaining a second track associated with the video data that has a second alternative group parameter. The second alternative group parameter and the first alternative group parameter may have a same value. The process may also include decoding the video data based on the first track or the second track in the CMAF switching set.

20 Claims, 7 Drawing Sheets

(56) References Cited

OTHER PUBLICATIONS

"Text of ISO/IEC DIS 14496-12 8th edition ISOB Base Media File Format," ISO/IEC JTC 1/SC 29/WG 03, N0651, MPEG Systems, Sep. 19, 2022 (2 pages total).

"Text of ISO/IEC FDIS 23000-19 3rd edition Common media application format (CMAF) for segmented media," ISO/IEC JTC 1/SC 29/WG 03, N0654, MPEG Systems, Jul. 21, 2022 (184 pages total).

Written Opinion of the International Searching Authority dated Feb. 1, 2024 in Application No. PCT/US23/35289.

International Search Report dated Feb. 1, 2024 in Application No. PCT/US23/35289.

Robert PECK, et al.,"Towards Mass Deployment of CMAF", Brightcove, Inc, Apr. 2019 (6 pages) Retrieved from the Internet <http://reznik.org/papers/PeckR_BEITC2019.pdf>.

\* cited by examiner

METHOD AND APPARATUS FOR SIGNALING CMAF SWITCHING SETS IN ISOBMFF

CROSS-REFERENCE TO RELATED APPLICATION

This application claims priority from U.S. Provisional Application No. 63/417,114, filed on Oct. 18, 2022, the disclosure of which is incorporated herein by reference in its entirety.

FIELD

This disclosure is directed to a set of advanced video coding technologies. More specifically, the present disclosure is directed to encoding and decoding switching sets in ISO-based media file format (ISOBMFF), the properties of the switching sets, and the associated tracks.

BACKGROUND

ISOBMFF is a widely used file format for media content. The common media application format (CMAF) standard defines common media format tracks that can be grouped as switching sets. CMAF switching sets are used for delivering of media with alternative tracks. The alternative tracks represent the same content but they have different attributes such as bitrate, resolution, frame rate, and other possible characteristics.

While the CMAF standard uses ISOBMFF as the track format, it does not include any specific method for signaling the existence of CMAF switching sets. Up to now, out-of-band signaling such as DASH manifest is used for such signaling. Therefore, there is a need to leverage CMAF standard for signaling the existence of CMAF switching sets in an ISOBMFF file.

SUMMARY

According to embodiments, a method for encoding or decoding video data may be provided. The method may include obtaining, from an ISO base media file format (ISOBMFF) track associated with a video data, a track group entry box, wherein the track group entry box indicates one or more tracks in a common media application format (CMAF) switching set associated with the video data, wherein the CMAF switching set indicates one or more tracks comprising alternative representations of the video data, and wherein the track group entry box comprises one or more CMAF switching set characteristics associated with the video data; obtaining a first track among the one or more tracks in the CMAF switching set associated with the video data, wherein the first track is among the one or more tracks in the CMAF switching set, and wherein the first track comprises a first alternative group parameter, the first alternative group parameter indicating the CMAF switching set the first track belongs to; obtaining a second track associated with the video data, wherein the second track comprises a second alternative group parameter, wherein the second track is among the one or more tracks in the CMAF switching set, and wherein the second alternative group parameter and the first alternative group parameter have a same value; and decoding the video data based on the first track or the second track in the CMAF switching set.

According to embodiments, an apparatus for encoding or decoding video data may be provided. The apparatus may include at least one memory configured to store program code; and at least one processor configured to read the program code and operate as instructed by the program code. The program code may include first obtaining code configured the cause the at least one processor to obtain, from an ISO base media file format (ISOBMFF) track associated with a video data, a track group entry box, wherein the track group entry box indicates one or more tracks in a common media application format (CMAF) switching set associated with the video data, wherein the CMAF switching set indicates one or more tracks comprising alternative representations of the video data, and wherein the track group entry box comprises one or more CMAF switching set characteristics associated with the video data; second obtaining code configured the cause the at least one processor to obtain a first track among the one or more tracks in the CMAF switching set associated with the video data, wherein the first track is among the one or more tracks in the CMAF switching set, and wherein the first track comprises a first alternative group parameter, the first alternative group parameter indicating the CMAF switching set the first track belongs to; third obtaining code configured the cause the at least one processor to obtain a second track associated with the video data, wherein the second track comprises a second alternative group parameter, wherein the second track is among the one or more tracks in the CMAF switching set, and wherein the second alternative group parameter and the first alternative group parameter have a same value; and first decoding code configured the cause the at least one processor to decode the video data based on the first track or the second track in the CMAF switching set.

According to embodiments, a non-transitory computer-readable medium stores computer instructions may be provided. The instructions may include one or more instructions that, when executed by one or more processors of a device for encoding or decoding video data may cause the one or more processors to obtain, from an ISO base media file format (ISOBMFF) track associated with a video data, a track group entry box, wherein the track group entry box indicates one or more tracks in a common media application format (CMAF) switching set associated with the video data, wherein the CMAF switching set indicates one or more tracks comprising alternative representations of the video data, and wherein the track group entry box comprises one or more CMAF switching set characteristics associated with the video data; obtain a first track among the one or more tracks in the CMAF switching set associated with the video data, wherein the first track is among the one or more tracks in the CMAF switching set, and wherein the first track comprises a first alternative group parameter, the first alternative group parameter indicating the CMAF switching set the first track belongs to; obtain a second track associated with the video data, wherein the second track comprises a second alternative group parameter, wherein the second track is among the one or more tracks in the CMAF switching set, and wherein the second alternative group parameter and the first alternative group parameter have a same value; and decode the video data based on the first track or the second track in the CMAF switching set.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

According to an aspect of the present disclosure, methods, systems, and non-transitory storage mediums for parallel processing of dynamic mesh compression are provided. Embodiments of the present disclosure may also be applied to static meshes.

Figure 1:
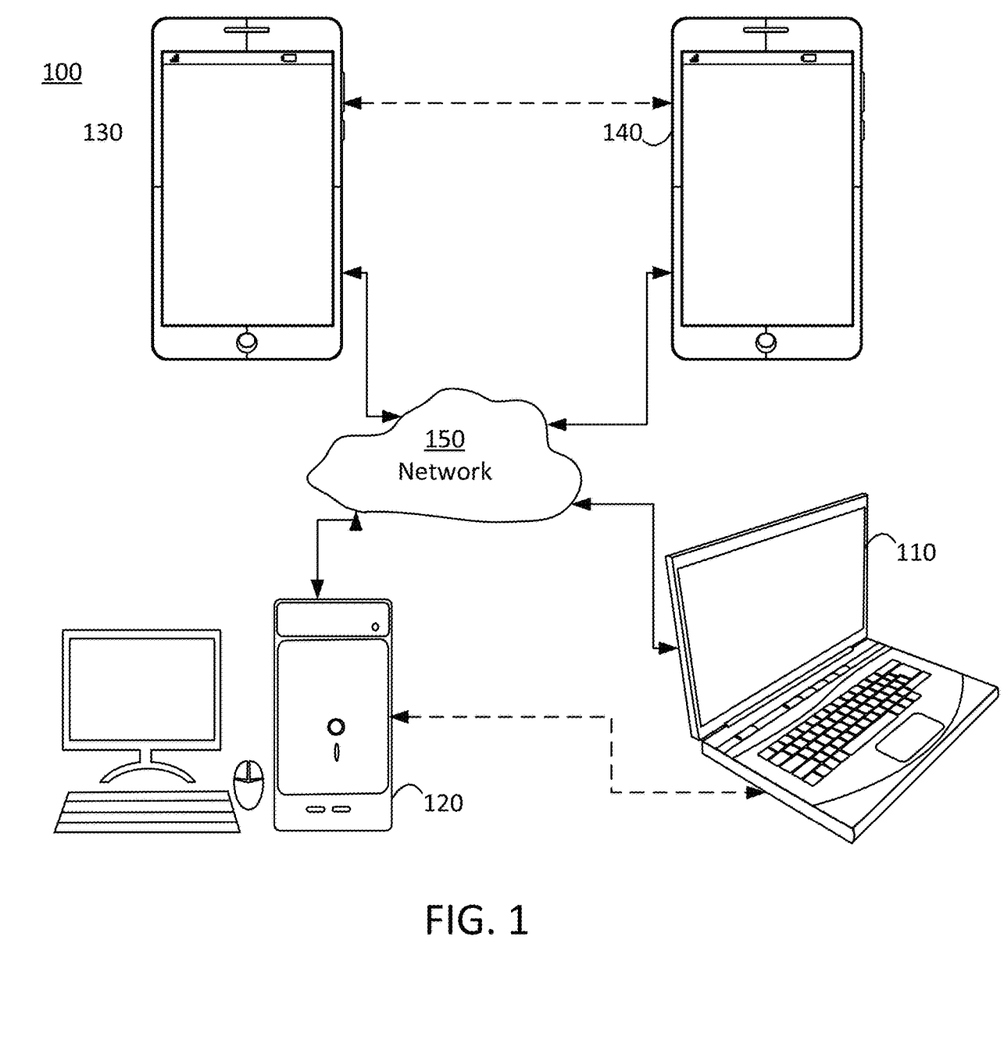
FIG. 1 is a schematic illustration of a simplified block diagram of a communication system, in accordance with embodiments of the present disclosure.
Figure 2:
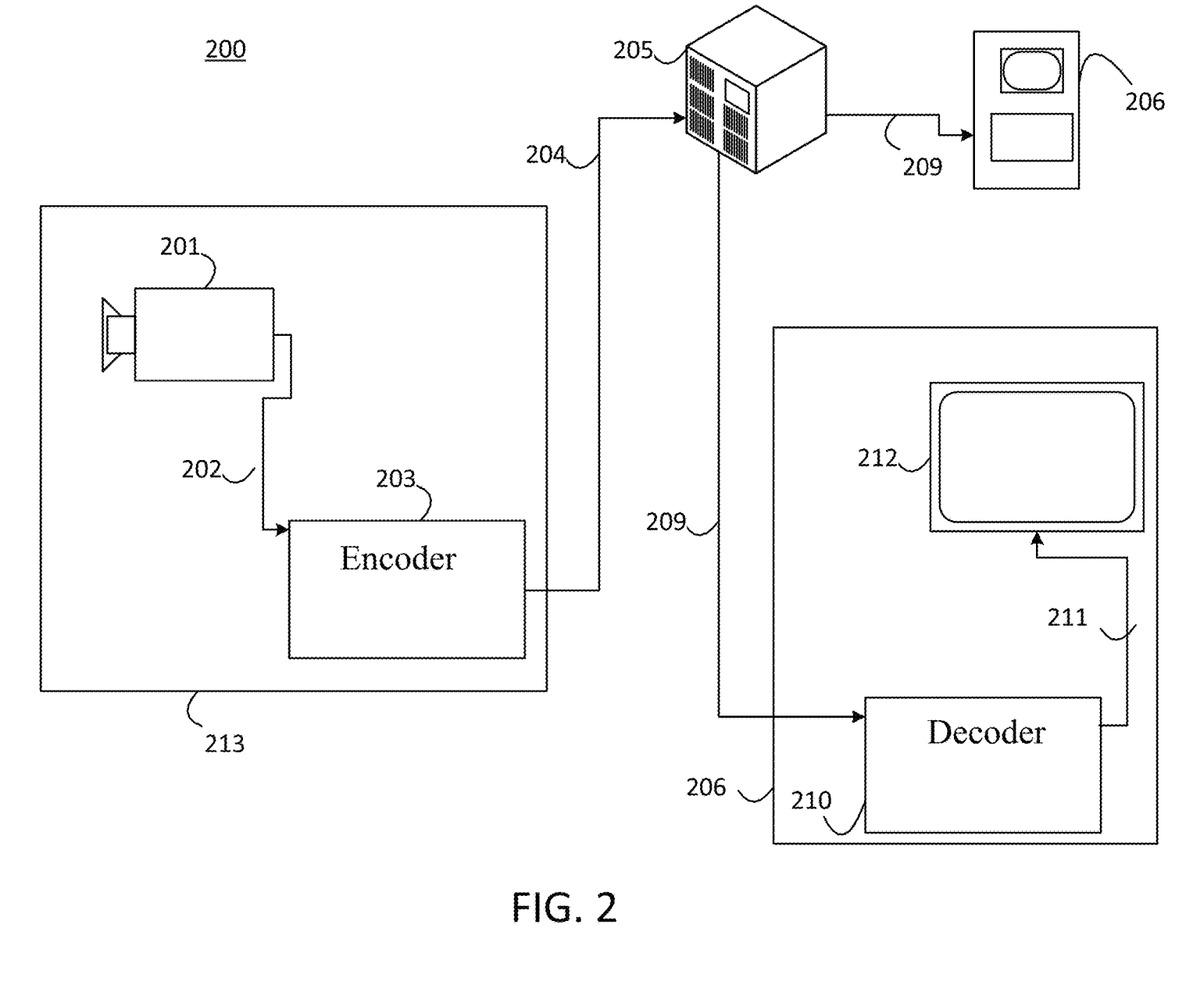
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Embodiments of the present disclosure relate to leveraging CMAF standard(s) for signaling the existence of CMAF switching sets in an ISOBMFF file.

Figure 3:
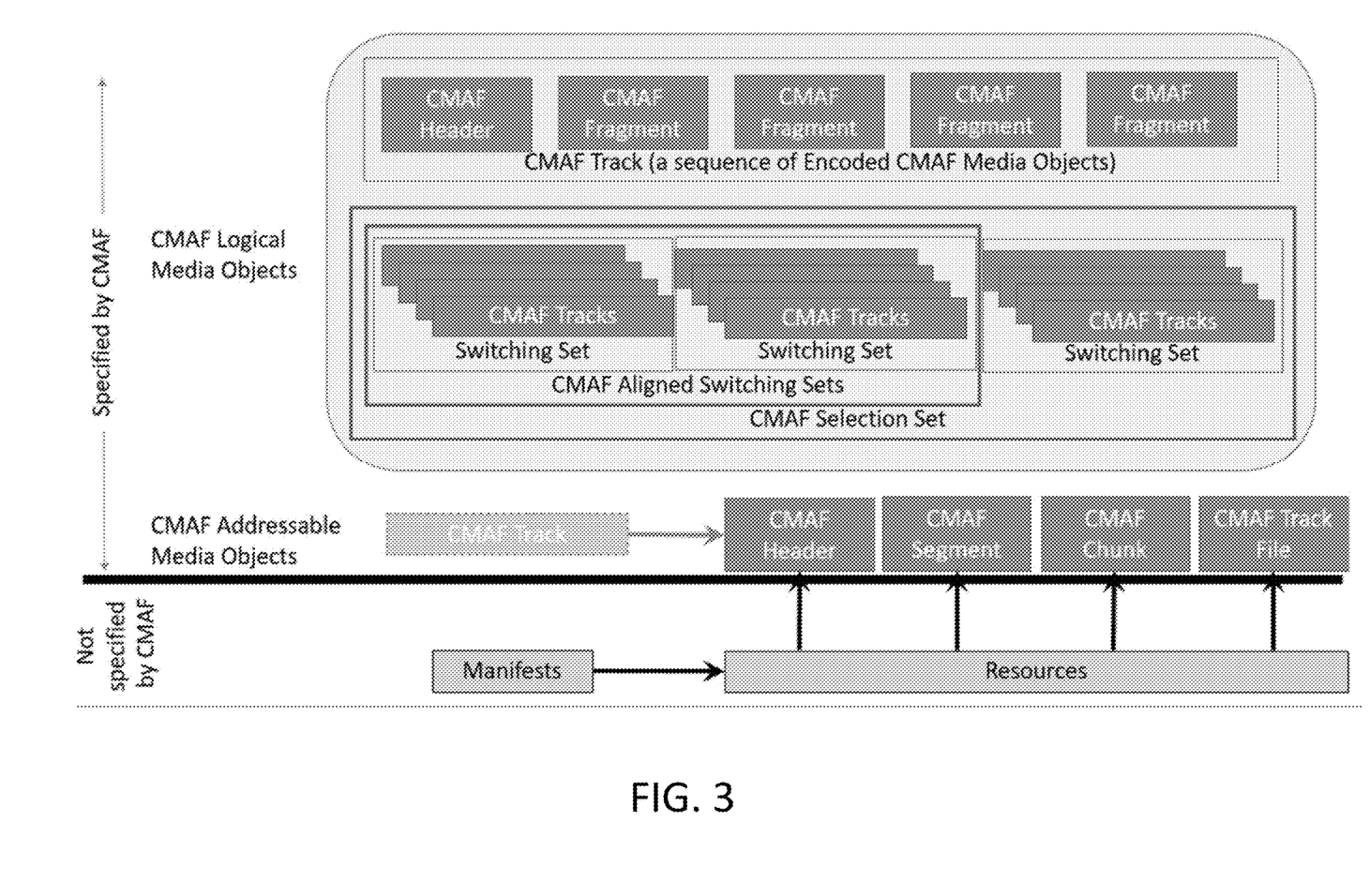
FIG. 3 is a simplified diagram of CMAF tracks and CMAF switching sets, in accordance with embodiments of the present disclosure.

FIG. 3 is an exemplary illustration 300 of CMAF tracks and CMAF switching sets.

According to embodiments, a CMAF switching set may be set of CMAF Tracks, each of which is an alternative encoding of the same source content constrained to enable seamless Track switching and decoding. A CMAF selection set may be a set of CMAF Switching Sets, where each Switching Set encodes an alternative aspect of the same Presentation over the same time period, only one of which is intended to be played at a time, e.g. a different language or codec.

According to embodiments, a CMAF track is a sequence of CMAF fragments of the same media stream in presentation order, and an associated CMAF header sufficient to initialize playback, with CMAF Fragments being ISOBMFF that conforms to CMAF encoding and packaging constraints.

According to embodiments, a CMAF header is a sequence of ISOBMFF boxes starting with a file type box and including a movie box that includes initialization information for a CMAF Track. A CMAF segment is a resource consisting of one or more consecutive CMAF Fragments from the same CMAF Track. a CMAF chunk resource that contains a single ISOBMFF segment that contains a sequential and contiguous subset of the samples of a CMAF Fragment. A CMAF track file is a CMAF Track stored in a single ISOBMFF file containing a CMAF Header and all CMAF Segments in sequence, starting from decode time zero.

As is shown in FIG. 3, a CMAF switching is a set of CMAF tracks that have some common constraints. The main purpose of a CMAF switching set is to provide alternate representations of the same content in multiple tracks, so that during the delivery or playback, the player can switch between tracks to accommodate the network bandwidth variation and other varying properties.

As stated above, the CMAF standard uses ISOBMFF for the track formats, but it does not provide to signal the existence of a CMAF switching set in the ISOBMFF file.

Embodiments of the present disclosure relate to an alternate_group flag of the ISOBMFF tkhd box (also referred to as 'track header box') to signal a set of tracks belonging to a CMAF switching set. While this flag can be used to signal alternate representations, the flag does not indicate whether this set is a CMAF switching set and its properties.

Embodiments of the present disclosure define a new track group box type for CMAF switching set. The track group entry box may be a special type of track box that defines the track requirements for common media format. In embodiments, it may be identified with a unique 4-character code such as 'cmsg' (only as an example) and the trackgroup box may include:

1. track_group_id may have a value equal to alternate_group of CMAF tracks in the switching set;
2. num_tracks may specify the number of tracks in this switching sets;
3. aligned may specify whether the tracks are time aligned;
4. single_init may specify whether the tracks have single initialization;
5. principal_id may indicate the track id that contains the principal header for this switching set;
6. structural_brand may indicate the CMAF structural brand that all the tracks in a particular switching set may conform to; or
7. mediaprofile_brand may indicate the CMAF file brand of a media profile that all tracks in this switching set may conform to.

In embodiments, each track which is part of the CMAF switching set may have alternate_group set equal to the track_group_id value of the CMAF track group entry box.

In an embodiment, signaling the CMAF switching set characteristics may use the track group box, similar to the way the preselection is done. In such an embodiment, a CMAF switching set track group entry box may be defined (such as 'cmsg') that may also include the above-mentioned parameters.

Figure 4:
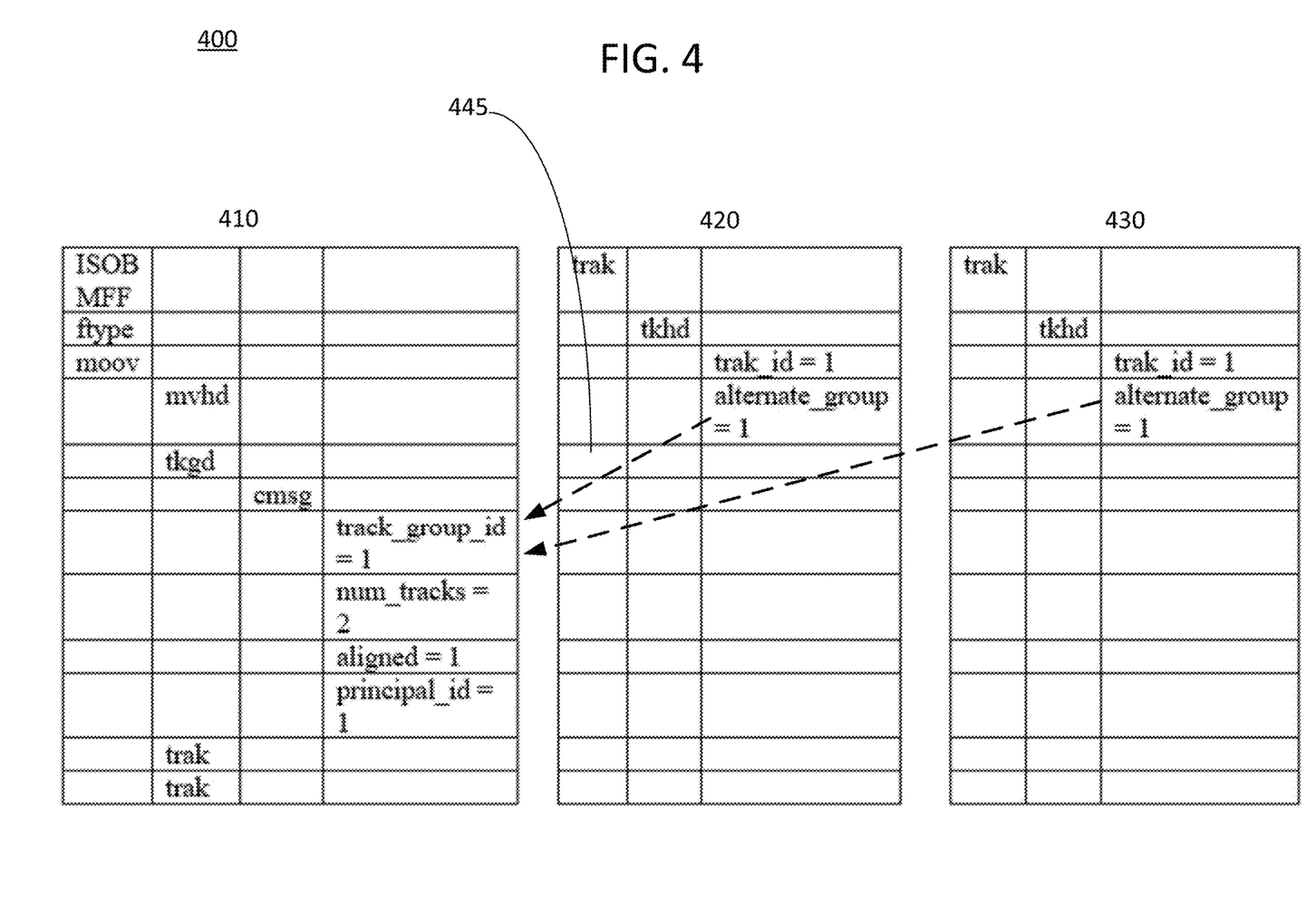
FIG. 4 is an exemplary illustration of the structure of a CMAF switching set in ISOBMFF in accordance with embodiments of the present disclosure.

FIG. 4 is an exemplary diagram 400 that illustrates an exemplary CMAF switching set with two tracks.

As shown in diagram 400, the arrows 445 indicate the association of tracks in a CMAF switching set and track group box (also referred to as "track group entry box") using the alternate_group and track_group_id. As an example, track 410, track 420, and track 430 are associated with each other. The track_group_id for ISOBMFF track 410 is equal to the alternate_group for track 420 and track 430. The value of the track_group_id for ISOBMFF track 410 being equal to the alternate_group for track 420 and track 430 indicates that the track 420 and track 430 are associated with each other and are alternative representations of the same media content but with different parameters. When decoding the media data, the decoder may use track 420 or track 430 based on parameters of the decoder, user device, or the network.

Figure 5:
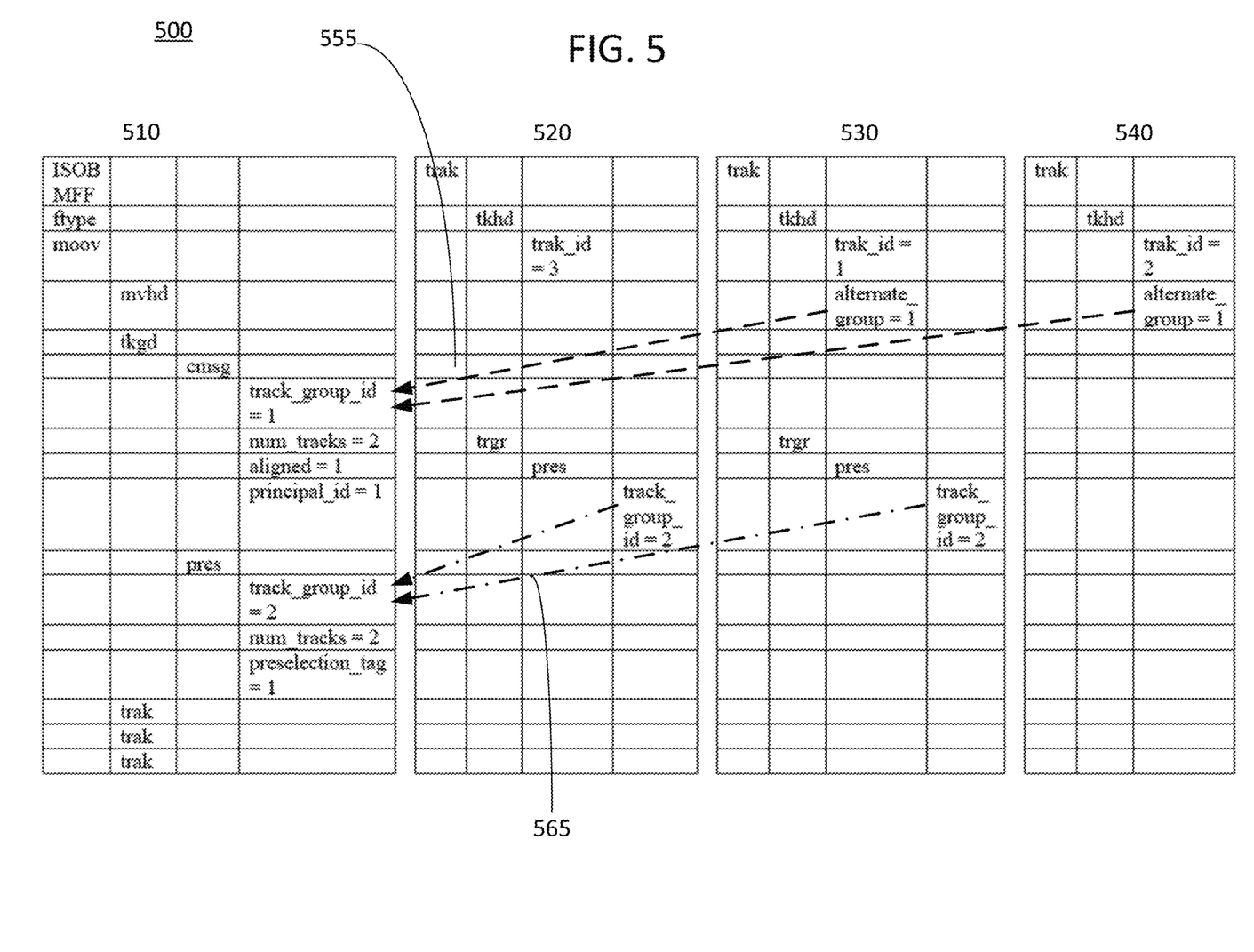
FIG. 5 is an exemplary illustration of the structure of a CMAF switching set in ISOBMFF in accordance with embodiments of the present disclosure.

FIG. 5 is an exemplary diagram 500 that illustrates an exemplary CMAF switching set with two tracks and one preselection set with two tracks.

As shown in diagram 500, the arrows 555 and the arrows 565 indicates the association of CMAF switching sets and CMAF preselection sets with the ISOBMFF track 510. As shown in the diagram 500, CMAF switching set and a preselection set may be used together.

As shown in the diagram 500, track 530 and track 540 are in one CMAF switching set and track 520 and track 530 are in one preselection set. According to an embodiment, track 540 can be used in the same preselection set with track 520 instead of track 530 because track 530 and track 540 are in one CMAF switching set.

Box Type: 'cmsg'
Container: TrackGroupDescriptionBox
Mandatory: No
Quantity: Zero or More CMAF Switching Group defines a set of tracks that are conforming the CMAF switching sets in ISO/IEC 23000-19. A CMAF Switching set may be qualified by its attributes.

CMAFSwitchingGroupEntryBox may describe only track groups identified by track_group_type equal to 'cmsg'. All CMAF Switching Groups with at least one contributing track having the track_in_movie flag set to 1 may be qualified by CMAFSwitchingGroupEntryBoxes. Otherwise, the presence of the CMAFSwitchingGroupEntryBoxes is optional. All attributes uniquely qualifying a preselection shall be present in CMAFSwitchingGroupEntryBox of the preselection.

Syntax

```
aligned(8) class CMAFSwtichingGroupEntryBox
extends TrackGroupEntryBox('cmsg', version=0, flags)
{
unsigned int(8) num_tracks;
unsigned int(8) aligned;
unsigned int(8) single_init;
unsigned int(8) principal;
utf8string structural_brand;
utf8string mediaprofile_brand;
}
```

Semantics

Below is information that may be contained in an exemplary box the CMAF switching group:

num_tracks may specify the number of alternative tracks grouped by this CMAF switching group or set. A track grouped by this CMAF switching track group may be a track with alernate_group equal to the ID of this switching group. Aligned may indicate an aligned CMAF Switching set when it is set to a 1. Otherwise, it may be set to 0. Other values are reserved. Single_init may indicate the CMAF Switching set with a single initialisation segment for all tracks when it is set to a 1. Otherwise, it may be set to 0. Other values are reserved. Principal may specify the track_id of the track that its initialisation segment can be used for the initialisation of any track in this switching group. Structural_brand may specify the CMAF structural brand of all tracks of this switching group. Mediaprofile_brand may specify the media profile brand that all tracks of this switching group conform to.

Embodiments of the present disclosure use the track group box to provide signaling for CMAF switching sets such that it does not interfere with other track groupings. The association of the CMAF switching sets with other track groups can thus be signaled easily.

According to an embodiment, a method for signaling the existence, association of tracks and properties of one or more CMAF switching sets in an ISOBMFF file may be provided. Each track may its alternative_group to signal its association, while a new type of track group box entry may be defined for CMAF switching sets such that its track_group_id may be same as the alternative_group of the associated tracks. Additionally, the properties of the CMAF switching set such as alignment, initialization segment properties, the CMAF structural and CMAF media profile brands may also signaled in the same track group entry, with such signaling coexisting with other track group signaling, such as preselection signaling, thus combining signaling CMAF switching sets with preselection signaling.

Figure 6:
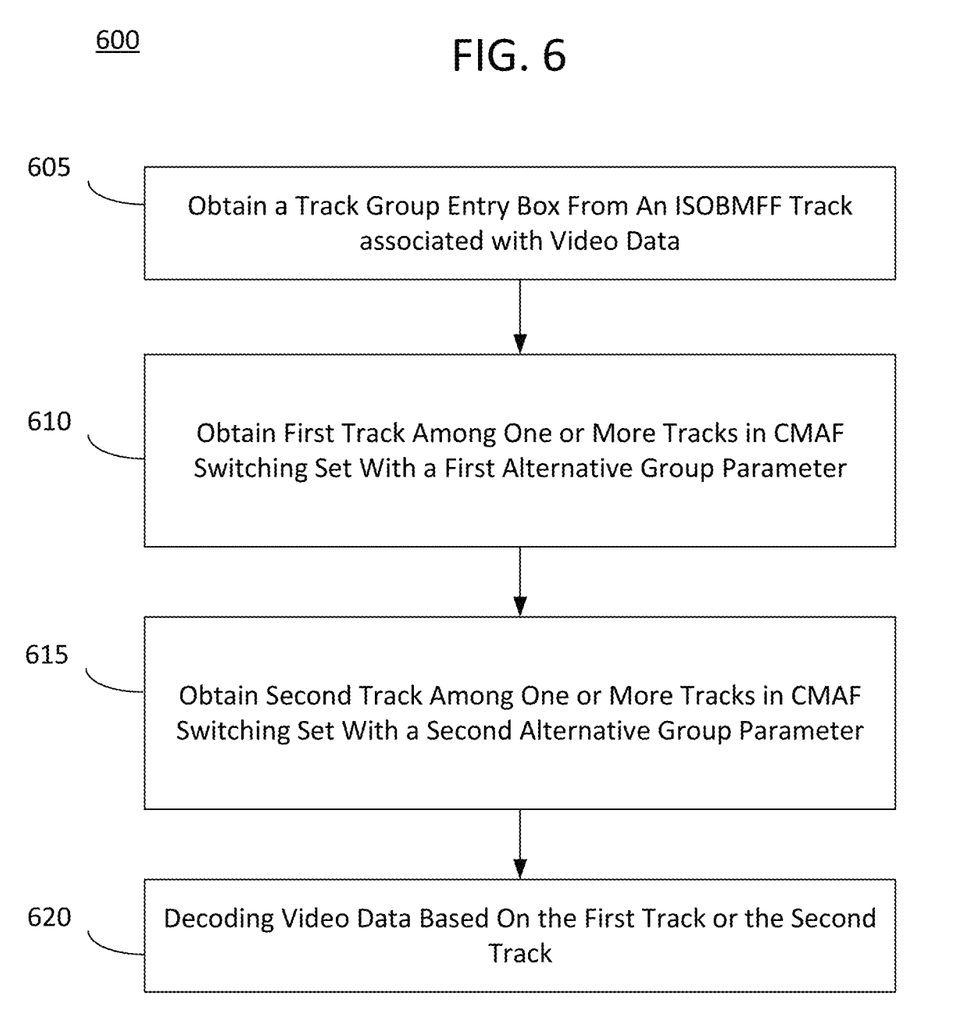
FIG. 6 is an exemplary flow diagram illustrating a process for signaling CMAF switching sets in accordance with embodiments of the present disclosure.

FIG. 6 illustrates an example process 600 to for signaling CMAF switching sets in accordance with embodiments of the present disclosure.

As shown in process 600, at operation 605, a track group entry box may be obtained from an ISO base media file format (ISOBMFF) track associated with a video data.

In embodiments, the track group entry box indicates one or more tracks in a common media application format (CMAF) switching set associated with the video data. In embodiments, the CMAF switching set may indicate one or more tracks comprising alternative representations of the video data. In embodiments, the track group entry box comprises one or more CMAF switching set characteristics associated with the video data.

The one or more CMAF switching set characteristics in the track group entry box may include a first track group id parameter that indicates an id of the track group entry box, with the first track group id parameter may be used to determine the one or more tracks in the CMAF switching set. In embodiments, a value of the first track group id parameter may be same as the value of respective alternative group parameters for the one or more tracks in the CMAF switching set.

The track group entry box may also include a track number parameter that indicates a total number of tracks in the CMAF switching set. The track group entry box may also include a principal id that indicates a track id containing a principal header for the CMAF switching set. The track group entry box may also include an alignment parameter that indicates whether the one or more tracks in the CMAF switching set are time aligned. The track group entry box may also include a structural band parameter that indicates a CMAF structural band the one or more tracks in the CMAF switching set belong to. The track group entry box may also include a media profile band parameter that indicates a CMAF file band of a media profile the one or more tracks in the CMAF switching set belong to.

In embodiments, each track in the one or more tracks in the CMAF switching set may have a respective alternative group parameter equal to a first track group id parameter of the CMAF switching set the one or more tracks belong to.

At operation 610, a first track among the one or more tracks in the CMAF switching set associated with the video data may be obtained. In some embodiments, a first alternative group parameter may also be obtained, with the first alternative group parameter indicating the CMAF switching set the first track belongs to. The first track may be among the one or more tracks in the CMAF switching set.

At operation 615, a second track among the one or more tracks in the CMAF switching set associated with the video data may be obtained. In some embodiments, a second alternative group parameter may also be obtained. In some embodiments, the second alternative group parameter and the first alternative group parameter have a same value, and indicates that the second track and the first track are among the one or more tracks in the CMAF switching set.

In embodiments, a third track associated with the video data may be obtained. In embodiments, the second track and the third track are tracks in a preselection track set. The third track (and second track) may include the preselection box, with the preselection box indicating that the third track is one of a plurality of preselection tracks.

At operation 620, the video data may be decoded based on the first track or the second track in the CMAF switching set. In embodiments, the decoding the video data is based on the plurality of the preselection tracks and the CMAF switching set. The decoding the video data may be based on the plurality of the preselection tracks and the CMAF switching set comprises decoding based on the first track and the third track or the second track and the third track. In embodiments, each track among the plurality of the preselection tracks may include a preselection track box, and wherein each track among the plurality of the preselection tracks has a same value of a second track group id parameter.

The techniques, described above, can be implemented as computer software using computer-readable instructions, and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
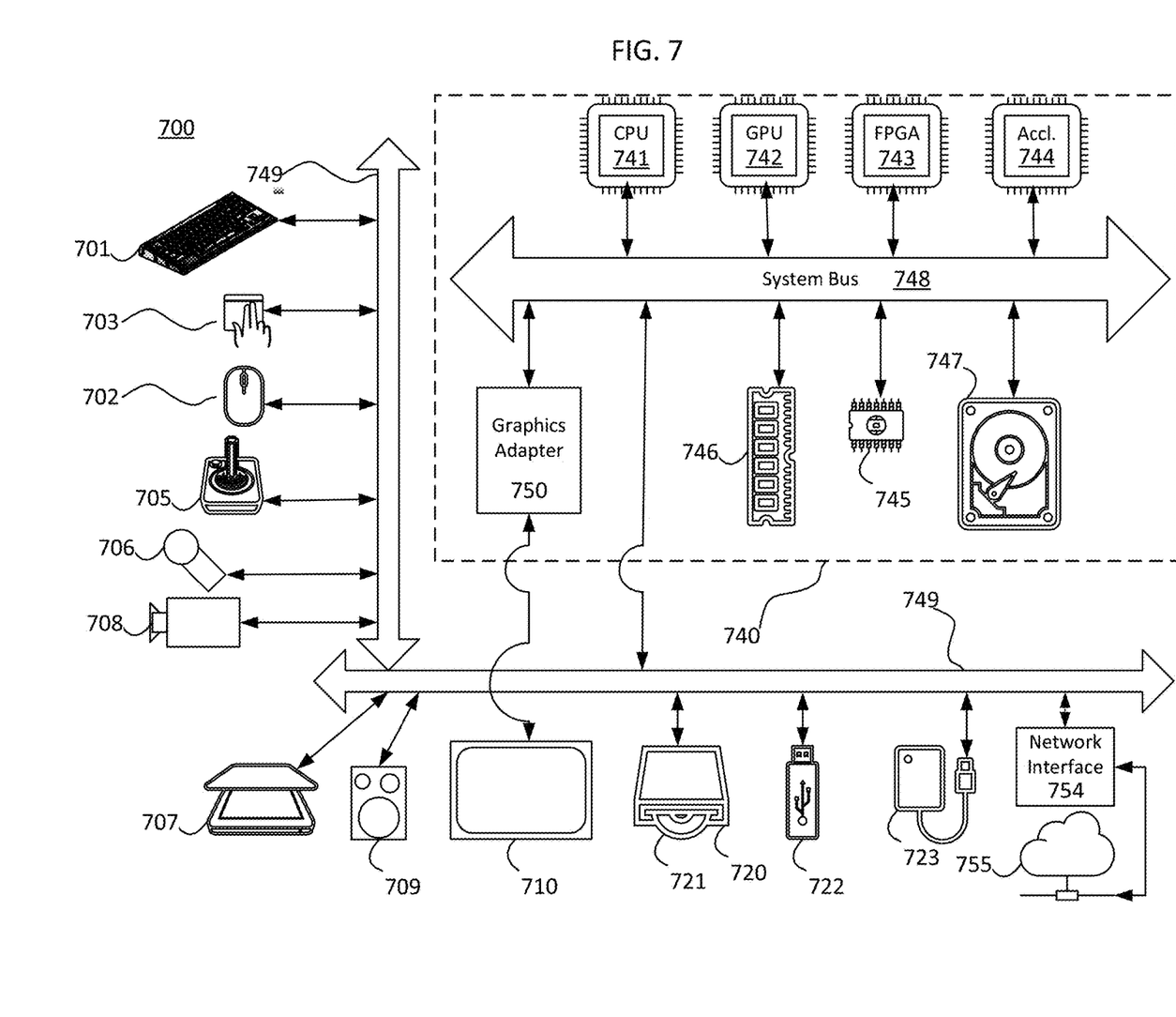
FIG. 7 is a diagram of a computer system suitable for implementing embodiments.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, a computer system having the architecture of computer system 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding media, the method being performed by at least one processor, the method comprising:
 obtaining, from an ISO base media file format (ISOBMFF) track associated with a video data, a track group entry box,
  wherein the track group entry box indicates one or more tracks in a common media application format (CMAF) switching set associated with the video data,
  wherein the CMAF switching set indicates one or more tracks comprising alternative representations of the video data, and
  wherein the track group entry box comprises one or more CMAF switching set characteristics associated with the video data;
 obtaining a first track among the one or more tracks in the CMAF switching set associated with the video data,
  wherein the first track comprises a first alternative group parameter indicating which CMAF switching set the first track belongs to;
 obtaining a second track among the one or more tracks in the CMAF switching set associated with the video data,
  wherein the second track comprises a second alternative group parameter, and
  wherein the second alternative group parameter and the first alternative group parameter have a same value; and
 decoding the video data based on the first track or the second track in the CMAF switching set.

2. The method of claim 1, wherein the one or more CMAF switching set characteristics in the track group entry box comprise:
 a first track group id parameter that indicates an id of the track group entry box,
  wherein the first track group id parameter is used to determine the one or more tracks in the CMAF switching set;
  wherein a value of the first track group id parameter is same as the value of respective alternative group parameters for the one or more tracks in the CMAF switching set;
 a track number parameter that indicates a total number of tracks in the CMAF switching set; and
 a principal id that indicates a track id containing a principal header for the CMAF switching set.

3. The method of claim 2, wherein the one or more CMAF switching set characteristics in the track group entry box further comprise:
 an alignment parameter that indicates whether the one or more tracks in the CMAF switching set are time aligned;
 a structural band parameter that indicates a CMAF structural band the one or more tracks in the CMAF switching set belong to; and
 a media profile band parameter that indicates a CMAF file band of a media profile the one or more tracks in the CMAF switching set belong to.

4. The method of claim 1, wherein each track in the one or more tracks in the CMAF switching set has a respective alternative group parameter equal to a first track group id parameter of the CMAF switching set the one or more tracks belong to.

5. The method of claim 1, wherein the second track comprises a preselection box, and the method further comprising:
 obtaining a third track associated with the video data,
  wherein the third track is a track in a preselection track set, and
  wherein the third track comprises the preselection box indicating that the third track is one of a plurality of preselection tracks; and
 wherein the decoding the video data is based on the plurality of the preselection tracks and the CMAF switching set.

6. The method of claim 5, wherein the decoding the video data based on the plurality of the preselection tracks and the CMAF switching set comprises decoding based on the first track and the third track or the second track and the third track.

7. The method of claim 6, wherein each track among the plurality of the preselection tracks comprises a preselection track box, and wherein each track among the plurality of the preselection tracks has a same value of a second track group id parameter.

8. An apparatus for decoding media, the apparatus comprising:
 at least one memory storing computer code; and
 at least one processor configured to access the computer code and operate as instructed by the computer code, the computer code including:
  first obtaining code configured the cause the at least one processor to obtain, from an ISO base media file format (ISOBMFF) track associated with a video data, a track group entry box,
   wherein the track group entry box indicates one or more tracks in a common media application format (CMAF) switching set associated with the video data,
   wherein the CMAF switching set indicates one or more tracks comprising alternative representations of the video data, and
   wherein the track group entry box comprises one or more CMAF switching set characteristics associated with the video data;
  second obtaining code configured the cause the at least one processor to obtain a first track among the one or more tracks in the CMAF switching set associated with the video data,
   wherein the first track comprises a first alternative group parameter indicating which CMAF switching set the first track belongs to;
  third obtaining code configured the cause the at least one processor to obtain a second track among the one or more tracks in the CMAF switching set associated with the video data,
   wherein the second track comprises a second alternative group parameter, and
    wherein the second alternative group parameter and the first alternative group parameter have a same value; and
  first decoding code configured the cause the at least one processor to decode the video data based on the first track or the second track in the CMAF switching set.

9. The apparatus of claim 8, wherein the one or more CMAF switching set characteristics in the track group entry box comprise:
- a first track group id parameter that indicates an id of the track group entry box,
  - wherein the first track group id parameter is used to determine the one or more tracks in the CMAF switching set;
  - wherein a value of the first track group id parameter is same as the value of respective alternative group parameters for the one or more tracks in the CMAF switching set;
- a track number parameter that indicates a total number of tracks in the CMAF switching set; and
- a principal id that indicates a track id containing a principal header for the CMAF switching set.

10. The apparatus of claim 9, wherein the one or more CMAF switching set characteristics in the track group entry box further comprise:
- an alignment parameter that indicates whether the one or more tracks in the CMAF switching set are time aligned;
- a structural band parameter that indicates a CMAF structural band the one or more tracks in the CMAF switching set belong to; and
- a media profile band parameter that indicates a CMAF file band of a media profile the one or more tracks in the CMAF switching set belong to.

11. The apparatus of claim 9, wherein the second track comprises a preselection box, and wherein the computer code further comprises:
- fourth obtaining code configured the cause the at least one processor to obtain a third track associated with the video data,
  - wherein the third track is a track in a preselection track set, and
  - wherein the third track comprises the preselection box, indicating that the third track is one of a plurality of preselection tracks; and
- wherein the first decoding code comprises decoding the video data is based on the plurality of the preselection tracks and the CMAF switching set.

12. The apparatus of claim 11, wherein the first decoding code comprises decoding the video data based on the first track and the third track or the second track and the third track.

13. The apparatus of claim 12, wherein each track among the plurality of the preselection tracks comprises a preselection track box, and wherein each track among the plurality of the preselection tracks has a same value of a second track group id parameter.

14. The apparatus of claim 8, wherein each track in the one or more tracks in the CMAF switching set has a respective alternative group parameter equal to a first track group id parameter of the CMAF switching set the one or more tracks belong to.

15. A non-transitory computer-readable medium storing instructions that, when executed by at least one processor, cause the at least one processor to:
- obtain, from an ISO base media file format (ISOBMFF) track associated with a video data, a track group entry box,
  - wherein the track group entry box indicates one or more tracks in a common media application format (CMAF) switching set associated with the video data,
  - wherein the CMAF switching set indicates one or more tracks comprising alternative representations of the video data, and
  - wherein the track group entry box comprises one or more CMAF switching set characteristics associated with the video data;
- obtain a first track among the one or more tracks in the CMAF switching set associated with the video data,
  - wherein the first track comprises a first alternative group parameter indicating which CMAF switching set the first track belongs to;
- obtain a second track associated with the video data,
  - wherein the second track comprises a second alternative group parameter, and
  - wherein the second alternative group parameter and the first alternative group parameter have a same value; and
- decode the video data based on the first track or the second track in the CMAF switching set.

16. The non-transitory computer-readable medium of claim 15, wherein the one or more CMAF switching set characteristics in the track group entry box comprise:
- a first track group id parameter that indicates an id of the track group entry box,
  - wherein the first track group id parameter is used to determine the one or more tracks in the CMAF switching set;
  - wherein a value of the first track group id parameter is same as the value of respective alternative group parameters for the one or more tracks in the CMAF switching set;
- a track number parameter that indicates a total number of tracks in the CMAF switching set; and
- a principal id that indicates a track id containing a principal header for the CMAF switching set.

17. The non-transitory computer-readable medium of claim 16, wherein the one or more CMAF switching set characteristics in the track group entry box further comprise:
- an alignment parameter that indicates whether the one or more tracks in the CMAF switching set are time aligned;
- a structural band parameter that indicates a CMAF structural band the one or more tracks in the CMAF switching set belong to; and
- a media profile band parameter that indicates a CMAF file band of a media profile the one or more tracks in the CMAF switching set belong to.

18. The non-transitory computer-readable medium of claim 15, wherein each track in the one or more tracks in the CMAF switching set has a respective alternative group parameter equal to a first track group id parameter of the CMAF switching set the one or more tracks belong to.

19. The non-transitory computer-readable medium of claim 15, wherein the second track comprises a preselection box, and the instructions further cause the at least one processor to:
- obtain a third track associated with the video data,
  - wherein the third track is a track in a preselection track set, and
  - wherein the third track comprises the preselection box indicating that the third track is one of a plurality of preselection tracks; and
- wherein the decoding the video data is based on the plurality of the preselection tracks and the CMAF switching set.

20. The non-transitory computer-readable medium of claim 19, wherein the decoding the video data based on the plurality of the preselection tracks and the CMAF switching set comprises decoding based on the first track and the third track or the second track and the third track.

* * * * *